(12) United States Patent
Serra Lleti et al.

(10) Patent No.: US 12,474,558 B2
(45) Date of Patent: Nov. 18, 2025

(54) FLUORESCENCE MICROSCOPY FOR A PLURALITY OF SAMPLES

(71) Applicant: LEICA MICROSYSTEMS CMS GMBH, Wetzlar (DE)

(72) Inventors: Jose Miguel Serra Lleti, Wetzlar (DE); Alexander Schmitz, Wetzlar (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 325 days.

(21) Appl. No.: 18/270,233

(22) PCT Filed: Jan. 5, 2022

(86) PCT No.: PCT/EP2022/050142
§ 371 (c)(1),
(2) Date: Jun. 29, 2023

(87) PCT Pub. No.: WO2022/148772
PCT Pub. Date: Jul. 14, 2022

(65) Prior Publication Data
US 2024/0118527 A1 Apr. 11, 2024

(30) Foreign Application Priority Data
Jan. 8, 2021 (EP) ..................................... 21150718

(51) Int. Cl.
*G02B 21/00* (2006.01)
*G02B 21/36* (2006.01)

(52) U.S. Cl.
CPC ....... *G02B 21/0076* (2013.01); *G02B 21/361* (2013.01); *G02B 21/365* (2013.01); *G02B 21/368* (2013.01)

(58) Field of Classification Search
CPC .............. G02B 21/0076; G02B 21/361; G02B 21/365; G02B 21/368; G02B 21/008;
(Continued)

(56) References Cited

U.S. PATENT DOCUMENTS 8,582,203 B2 11/2013 Dunsby
10,001,634 B2 6/2018 Lippert et al.
(Continued)

FOREIGN PATENT DOCUMENTS

DE 102016119268 B3 12/2017
DE 102005027077 B4 2/2018
(Continued)

OTHER PUBLICATIONS

Dorrer, C. et al.; "Optical testing using the transport-of-intensity equation"; *Optics Express*; Jun. 11, 2007; pp. 7165-7175; vol. 15, No. 12; Optical Society of America; Washington, DC., USA.
(Continued)

*Primary Examiner* — Matthew Mikels
(74) *Attorney, Agent, or Firm* — LEYDIG, VOIT & MAYER, LTD.

(57) ABSTRACT

An arrangement for examining a plurality of samples within a sample region includes optics configured to selectively image the sample region in a transmitted light imaging mode or a fluorescence imaging mode. The arrangement further includes a processing apparatus configured to provide first operating instructions causing the arrangement to be operated in the transmitted light imaging mode, select one or more regions of interest in the sample region based on selection information obtained based on a stack of widefield images generated in the transmitted light imaging mode, provide position information relating to the one or more regions selected in the sample region, and provide second operating instructions causing the arrangement to be operated in the fluorescence imaging mode at fluorescence imaging positions based on the position information.

18 Claims, 6 Drawing Sheets

(58) Field of Classification Search
CPC ......... G02B 21/367; G01N 2201/1296; G01N 21/6452; G01N 21/6458
See application file for complete search history.

(56) References Cited

U.S. PATENT DOCUMENTS

| | | | |
|---|---|---|---|
| 10,295,814 B2 | 5/2019 | Siebenmorgen et al. | |
| 2019/0078985 A1 | 3/2019 | Albrecht et al. | |
| 2019/0243118 A1 | 8/2019 | Schumann | |
| 2020/0142170 A1 | 5/2020 | Cai | |
| 2021/0199582 A1* | 7/2021 | Fereidouni | G01N 21/6428 |

FOREIGN PATENT DOCUMENTS

| | | |
|---|---|---|
| DE | 102016204653 B4 | 12/2022 |
| EP | 2870500 B1 | 10/2019 |
| WO | WO 2020006129 A1 | 1/2020 |
| WO | WO 2020163267 A1 | 8/2020 |

OTHER PUBLICATIONS

Maioli, Vincent et al.; "Time-lapse 3-D measurements of a glucose biosensor in multicellular spheroids by light sheet fluorescence microscopy in commercial 96-well plates"; *Scientific Reports*; Nov. 25, 2016; pp. 1-13; vol. 6, No. 37777; Nature Portfolio; London, UK.

Rivenson, Yair et al.; "Deep learning microscopy"; *Optica*; Nov. 20, 2017; pp. 1437-1443; vol. 4, No. 11; Optical Society of America; Washington, DC., USA.

Sikkel, Markus B. et al.; "High speed sCMOS-based oblique plane microscopy applied to the study of calcium dynamics in cardiac myocytes"; *Journal of Biophotonics*; Oct. 22, 2015; pp. 311-323; vol. 9, No. 3; WILEY-VCH Verlag GmbH & Co. KGaA; Weinheim, Germany.

* cited by examiner

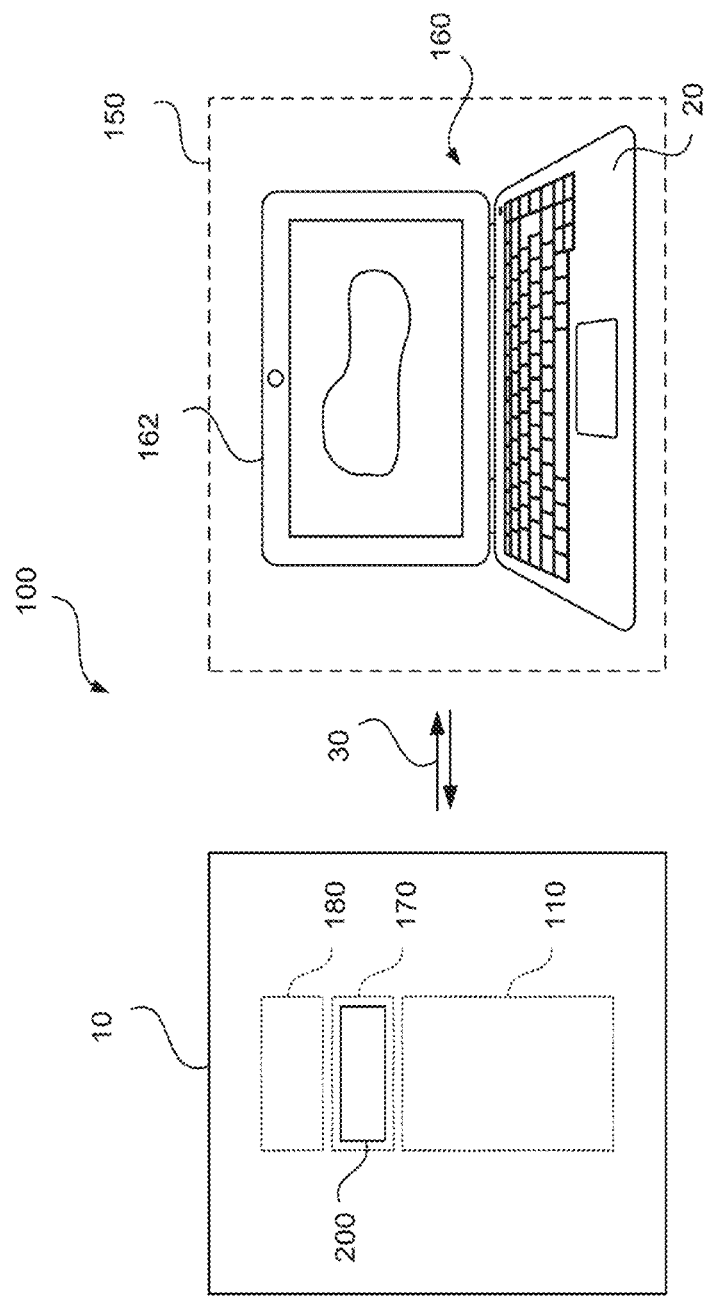

FLUORESCENCE MICROSCOPY FOR A PLURALITY OF SAMPLES

CROSS REFERENCE TO RELATED APPLICATIONS

This application is a U.S. National Phase application under 35 U.S.C. § 371 of International Application No. PCT/EP2022/050142, filed on Jan. 5, 2022, and claims benefit to European Patent Application No. EP 21150718.1, filed on Jan. 8, 2021. The International Application was published in English on Jul. 14, 2022 as WO 2022/148772 A1 under PCT Article 21(2).

FIELD

Embodiments of the present invention relate to an arrangement for examining a plurality of microscopic samples by fluorescence microscopy, as well as to a corresponding method and to means for implementing such a method.

BACKGROUND

Multiwell plates have become a tool of choice for analyzing biological samples. So-called plate readers based on different optical principles are commonly used for analyzing samples in multiwell plates in in many areas of biology. For example, multiwell plates may be used to perform parallel experiments to test a plurality of conditions at the same time and a plate reader can be automated to repeatedly image every well in order to obtain time-lapse data in each of them.

SUMMARY

An arrangement configured for examining a plurality of samples within a sample region includes optics configured to selectively image the sample region in a transmitted light imaging mode or a fluorescence imaging mode. The transmitted light imaging mode is adapted to generate and process a stack of widefield images of the sample region. The fluorescence imaging mode is adapted to obtain fluorescence images of at least one of the plurality of samples at one or more fluorescence imaging positions and to process the fluorescence images. The arrangement further includes a processing apparatus configured to provide first operating instructions causing the arrangement to be operated in the transmitted light imaging mode, select one or more regions of interest in the sample region based on selection information obtained based on the stack of widefield images generated in the transmitted light imaging mode, provide position information relating to the one or more regions of interest selected in the sample region, and provide second operating instructions causing the arrangement to be operated in the fluorescence imaging mode at the one or more fluorescence imaging positions based on the position information relating to the one or more regions of interest.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following:

FIG. 1 illustrates an arrangement according to an embodiment of the present invention in an overview;

DETAILED DESCRIPTION

Figure 2A:
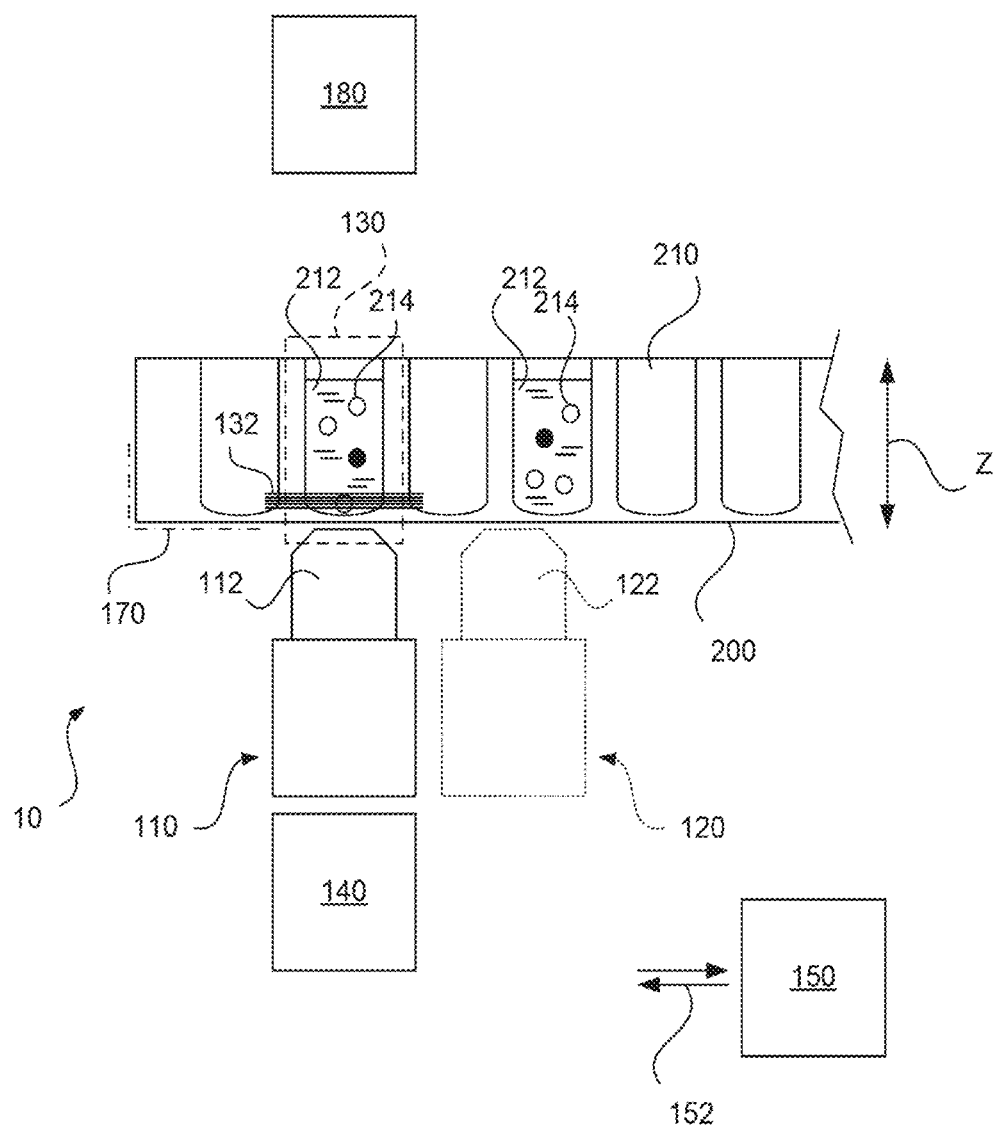
FIGS. 2A and 2B illustrate operating modes of an arrangement according to an embodiment of the present invention in a partial view.

In an embodiment, the present invention improves known approaches for analyzing a plurality of samples, particularly, but not limited to, samples in or on carriers such as multiwell plates or petri dishes, by fluorescence microscopy techniques, especially in the context of repeated experiments.

An arrangement configured for examining a plurality of samples within a sample region is provided, the arrangement comprising optics configured to selectively image the sample region in a transmitted light imaging mode and a fluorescence imaging mode, the transmitted light imaging mode being adapted to generate and process a stack of widefield images of the sample region, and the fluorescence imaging mode being adapted to obtain fluorescence images of at least one of the samples at fluorescence imaging positions and to process said fluorescence images.

The arrangement further comprises a processing apparatus configured to perform, in the sample region, the steps of (a) providing operating instructions causing the arrangement to be operated in the transmitted light imaging mode, (b) selecting one or more regions of interest in the sample region based on selection information obtained on the basis of the stack of widefield images generated in the transmitted light imaging mode, (c) providing position information relating to the one or more regions of interest selected in the sample region, and (d) providing operating instructions causing the arrangement to be operated in the fluorescence imaging mode at the one or more fluorescence imaging positions on the basis of the position information.

In conventional approaches including fluorescence microscopy, a user must manually search for objects of interest in a sample and examine and evaluate the results from different fluorescence channels before then deciding which sample is suitable for further imaging experiments. In connection with such a conventional search and evaluation, valuable time is wasted and the specimen is stressed by a continuing light exposure. This may render the specimen unusable for further investigations because the fluorescence signals get lost due to photobleaching effects or the specimen is damaged by phototoxic effects. These disadvantages are overcome according to embodiments of the present invention. A workflow comprising the steps mentioned has the particular advantage that the energy input into the samples is kept as low as possible because a sample-friendly transmitted light imaging modality is used for a pre-screen or pre-scan, i.e. in the step in which the stack of widefield images is obtained. In contrast to known methods, reduced amounts of light, such as fluorescence-emitting light, are needed due to the pre-scan performed using the widefield imaging mode.

In an embodiment of the present invention, the fluorescence imaging mode is a lightsheet imaging mode and the arrangement is configured to provide a lightsheet at the fluorescence imaging positions in the lightsheet imaging mode. Lightsheet fluorescence microscopy has proven to be an advantageous alternative to widefield fluorescence microscopy and confocal laser scanning fluorescence microscopy. Lightsheet fluorescence microscopy is a non-destructive method that may, according to corresponding embodiments of the present invention, be advantageously used to produce optical sections that are suitable for three-dimensional reconstruction and can essentially be seen as a "non-destructive microtome" technique.

Herein, the term "lightsheet microscopy", "lightsheet technique", etc., shall refer to a technique in which, using technical means as generally known from the art, such as by using a cylindrical lens, a sheet of light with dimensions as explained below is irradiated into the sample, e.g., in parallel with a focal plane of a detecting microscope lens or objective or a detection axis or beam path thereof (which may also be inclined to the optical axis of the lens). For further features, reference is made to the explanations below. The term "image stack" or "stack of widefield images" shall refer to a plurality of images taken at the same or overlapping lateral positions and at different distances to the imaging lens (i.e. the same or overlapping X and Y positions and at different Z positions in a coordinate system wherein the z axis corresponds to the axis of the imaging beam path).

According to an embodiment of the present invention, the proposed arrangement may further comprise user interface means being configured to provide the selection information on the basis of a user input. This allows a user to specifically select which samples or sample regions to be examined further, thus reducing a time-intensive and potentially harmful irradiation of light to less relevant samples or regions.

In an embodiment of such an arrangement, the user interface means may be configured to present user information provided on the basis of the stack of widefield images obtained in the transmitted light imaging mode to the user, the user information being derived from the stack of widefield images and including at least one of position information relating to potential regions of interest, a textual representation of potential regions of interest, and a graphic representation relating to potential regions of interest. In such an embodiment, the information may therefore be provided to a user in a manner which may simplify the evaluation of sample content for later processing.

According to an embodiment of the present invention, the processing apparatus may be configured to automatically preselect the potential regions of interest on the basis of an automated image analysis of the stack of widefield images for presentation as the user information. In such an embodiment, in which the preselection is performed by an automated image analysis, therefore, a user selection may be supported by an automatic pre-selection which improves user-friendliness and reliability.

In a corresponding embodiment, the user input may be adapted to select from the potential regions of interest by confirming and rejecting preselected regions of interest included in the user information. In contrast to conventional technologies, the user is therefore essentially relieved of prior search and evaluation steps.

According to an embodiment of the present invention, the user information may be provided on a display screen of the user interface means, such that a user may be advantageously visually guided in a corresponding method.

In an embodiment of the present invention, at least step (b) mentioned above may be performed fully automatically by the processing apparatus on the basis of an automated image analysis without user interaction. This further simplifies the examination of samples by a user.

The automated image analysis may be performed on the basis of machine learning. Therefore, in an embodiment of the present invention, the automated image analysis may be improved by a corresponding training to increase the detection accuracy.

In an embodiment of the present invention, the optics configured to selectively image the sample region in the transmitted light imaging mode and the fluorescence imaging mode may comprise a common lens, the common lens being configured to image the sample region in the transmitted light imaging mode and in the fluorescence imaging mode and to irradiate light into the sample region in the fluorescence imaging mode. Such an arrangement improves access to the samples or to a sample carrier because illumination and detection is performed from the same side.

In a corresponding embodiment of the present invention, the optics configured to selectively image the sample region may be adapted to perform oblique plane lightsheet microscopy in the fluorescence imaging mode, which has the particular advantage of improved access to the samples as already mentioned.

In embodiments of the present invention, the position information may comprise at least one of one or more geometrical centres and one or more dimensions of the one or more region of interest. This allows for an exchange, transmission and documentation of such sample information in an abstracted form.

A method for examining a plurality of samples within a sample region is also provided. In the method, the sample region is selectively imaged in a transmitted light imaging mode and a fluorescence imaging mode, the transmitted light imaging mode comprising generating and processing a stack of widefield images of the sample region, and the fluorescence imaging mode comprising obtaining and processing fluorescence images of the sample at fluorescence imaging positions.

The method includes performing, in the sample region, the steps of (a) providing operating instructions causing the arrangement to be operated in the transmitted light imaging mode, (b) selecting one or more regions of interest in the sample region using selection information obtained on the basis of the stack of widefield images generated in the transmitted light imaging mode, (c) providing position information relating to the one or more regions of interest selected in the sample region, and (d) providing operating instructions causing the arrangement to be operated in the fluorescence imaging mode at one or more fluorescence imaging positions on the basis of the position information.

As to the particular advantages of such a method, reference is made to the explanations regarding the arrangement and embodiments thereof above. This is also the case for an embodiment of such a method in which the fluorescence imaging mode may be a lightsheet imaging mode in which a lightsheet is provided at the fluorescence imaging positions.

According to an embodiment of the present invention, the plurality of samples may be provided on a sample carrier in the form of a multiwell plate or a petri dish and/or the plurality of samples may be biological cells in cell consortia, aggregates or tissues. For examination of such samples or sample carriers, embodiments of the present invention may provide particular advantages, as mentioned.

A computer program with a program code for performing a method as explained, when the computer program is run on a processor, is also provided. Again, for specific features and advantages, reference is made to the explanations above.

FIG. 1 illustrates an arrangement 100 according to an embodiment of the present invention in a general overview, on the basis of which details of embodiments of the present invention and the underlying concepts will be explained.

The arrangement 100 comprises a microscope system 10 and a computer system 20. The microscope system 10, which may include optics 110 as further described at other places herein, and the computer system 20, which may be part of, or represent, a processing apparatus 150 as further described at other places herein, may in unison be configured to execute at least a part of a method as provided according to embodiments of the present invention.

In the illustration of FIG. 1, which is strictly schematic and radically simplified for reasons of generality, the microscope system 10 is illustrated as an inverted microscope system wherein said optics 110 are arranged below a sample holder 170 adapted to receive a sample carrier 200 as further explained below. Above the sample holder, an illumination device 180 is provided The computer system 20 may be configured to execute a machine learning algorithm. The computer system 20 and the microscope system 10 may be separate entities but can also be integrated together in one common housing. The computer system 20 may be part of a central processing system of the microscope system 10 or comprise such a system, as mentioned, and/or the computer system 20 may be part of a subcomponent of the microscope system 10, such as a sensor, an actor, a camera or an illumination unit, etc. of the microscope system 10. It may interact with the microscope system 10 as illustrated with bidirectional arrows 30 using known communication means in wired or wireless form.

The computer system 20 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centres). The computer system 20 may comprise any circuit or combination of circuits. In one embodiment, the computer system 20 may include one or more processors which can be of any type.

As used herein, the term "processor" may refer to any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the computer system 20 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems.

The computer system 20 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like.

The computer system 20 may also include a display device, one or more speakers, and a keyboard and/or controller, which can include a mouse, trackball, touch screen, voice-recognition device, or any other device that permits a system user to input information into and receive information from the computer system 20 and or the overall arrangement 100. As illustrated, a screen 162 of the computer 20, and a keyboard and the like may be user interface means 160 referred to herein.

While embodiments of the present invention are described herein in connection with lightsheet fluorescence imaging as a specific fluorescence imaging mode, further embodiments of the present invention may include fluorescence imaging techniques other than lightsheet imaging. The terms "fluorescence imaging", "fluorescence technique", etc., as used herein, shall therefore refer to any microscopic technique in which a sample is illuminated with light, at one or more wavelengths or in one or more wavelength bands (excitation light) in order to generate a fluorescence response of fluorescent molecules (fluorophores) with which one or more samples are tagged or stained. The fluorescence response (emission light) may be detected in one or more detection channels. By using fluorescence detection, sample features may be highly contrasted to the background.

Examples of fluorescence techniques that may be used according to embodiments of the present invention may include widefield and confocal fluorescence microscopy and any types of resolution-enhanced and time-resolved fluorescence microscopy techniques. Embodiments of the present invention may also be used in connection with conventional epifluorescence microscopy.

Examples of resolution-enhanced fluorescence microscopy techniques that may be used in embodiments of the present invention, alone or in any suitable combination with each other or with further techniques, may include total internal reflection fluorescence (TIRF) microscopy, stimulated emission depletion (STED) microscopy, any other technique based on reversible saturable optical linear (fluorescence) transitions (RESOLFT), techniques using structured illumination and localisation microscopy techniques such as, but not limited to, photoactivated localization microscopy (PALM) and stochastic optical reconstruction microscopy (STORM).

Generally, in fluorescence microscopy, the fluorescence emission can be characterised not only by intensity and position, but also by lifetime, polarization and wavelength, and embodiments of the present invention may be used in connection with any of these characterization techniques or combinations thereof. Examples of time-resolved fluorescence microscopy techniques usable in connection with embodiments of the present invention include, but are not limited to, fluorescence lifetime imaging (FLIM) and time-resolved fluorescence anisotropy imaging (TR-FAIM). Such methods may also include techniques for detecting fluorescence or Förster resonance energy transfer (FRET), e.g., in connection with TIRF microscopy mentioned above. Embodiments of the present invention may also include techniques such as fluorescence recovery after photobleaching (FRAP) or fluorescence loss in photobleaching (FLIP) techniques.

Confocal microscopy, most frequently confocal laser scanning microscopy (CLSM) or laser confocal scanning microscopy (LCSM) may generally also be used in embodiments of the present invention. Confocal microscopy is an optical imaging technique for increasing optical resolution and contrast of a micrograph by means of using a spatial pinhole to block out-of-focus light in image formation. Capturing multiple two-dimensional images at different depths in a sample in confocal microscopy enables the reconstruction of three-dimensional structures within an object. Confocal time-resolved confocal fluorescence techniques usable in connection with embodiments of the present invention may include, without limitation, techniques such as time-correlated single photon counting (TCSPC) based confocal scanning. Reference is made to textbook literature.

Embodiments of the present invention may be used with all fluorescence microscopy techniques and illumination/detection modalities, including the use of any types of emission and excitation filters, any types of polychromatic and monochromatic light sources, and any types of photon-counting (point) or area detectors (cameras).

All types of fluorescence microscopy can take profit of the advantages provided according to embodiments of the present invention, which include a reduction in light exposition of the sample and a higher examination speed. While not being limited thereby, embodiments of the present invention will further be described with reference to lightsheet imaging and corresponding microscopes.

Figure 2B:
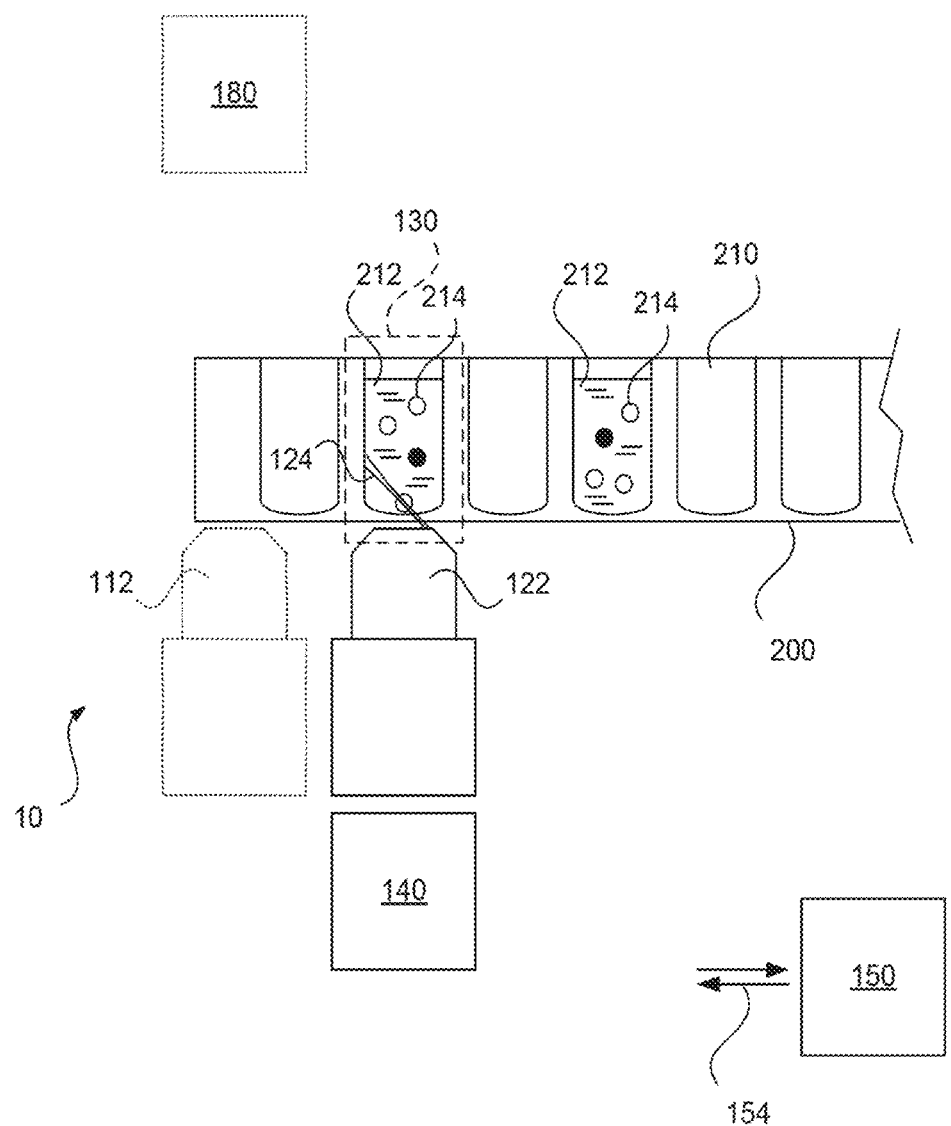

FIGS. 2A and 2B illustrate an arrangement 100 according to a preferred embodiment of the present invention in a partial view and in two modes of operation.

As shown in FIGS. 2A and 2B, a sample carrier 200 in the form of a multiwell plate is inserted in a sample holder 170 of the microscope system 10 of which only selected parts are illustrated, such as optics 110 and 120 with lenses 112 and 122, respectively, an image acquisition unit 140, and the illumination device 180. A sample region momentarily observed is indicated with 130. In wells 210 of the sample carrier 200, as shown in two examples, samples 214 illustrated in the form of filled and empty circles are randomly contained in a liquid 212 or matrix. In all embodiments of the present invention, the term "sample region" may also relate to a plurality of disjoint sub-regions without limitation.

The optics 110 or 110 and 120 are adapted to selectively image the sample region 130 in a transmitted light imaging mode, as shown in FIG. 2A, and in a lightsheet imaging mode as shown in FIG. 2B, the transmitted light imaging mode comprising generating and processing a stack of widefield images 132 of the sample region 130, by shifting the sample holder 170 stepwise in a Z direction, as illustrated by a bidirectional arrow, and the lightsheet imaging mode comprises obtaining lightsheet images of the sample at lightsheet imaging positions on the basis of a lightsheet 124 and processing said lightsheet images. While in FIG. 2A, the optics 110 are shown to perform the transmitted light imaging mode using the illumination device 180 and the optics 120 are shown to perform the transmitted light imaging mode in FIG. 2B, both imaging modes may also be performed using the same, or at least a part of the same optics 110, as frequently mentioned before.

The processing apparatus 150, being part of, or including, the computer system 10 shown in FIG. 1, may be adapted to perform, for at least one position in the sample region 130, the steps of an embodiment of an inventive method as further explained below in connection with FIGS. 2A and 2B.

The term "sample", in the context used herein, shall preferably refer to any kind of biologic material, e.g., a (semi-)transparent biologic material, which may be analyzed using fluorescence microscopy, such as lightsheet fluorescence microscopy. A sample used in the context of embodiments of the present invention may be stained or otherwise contacted with any type of differentiating substance, e.g., with one or more known fluorescence stains comprising one or more fluorophores excitable by using excitation light of one or more wavelengths or wavelength regions, the excitation light being provided in the form of a lightsheet of a lightsheet fluorescence microscope as explained. Staining or labelling may be based on chemical or immunological interactions. The term "sample plane" shall denote a plane defined by a horizontal extension of a sample carrier such as multiwell plate or a petri dish, and may correspond to the lower surface or of such items. A "sample region" may be any two- or three-dimensional area or space in which one or more samples may be contained. A sample region may also be distributed across multiple sites such as wells of a multi-well plate.

A sample used in the context of embodiments of the present invention may be a set or consortium of cells which may be connected by cell-to-cell interactions in a tissue, an embryo, or a similar cell aggregate or which may be unconnected by cell-to-cell interactions. Embodiments of the present invention may be used in connection with so-called three-dimensional cell cultures as samples.

In a three-dimensional cell culture, cells grow and interact in artificial environments in all three spatial directions. In contrast to two-dimensional environments, in three-dimensional cell cultures cells are allowed to grow and interact in all directions in vitro, at least partially resembling growth and interaction in vivo. Three-dimensional cell cultures are usually cultivated in bioreactors, in small capsules in which the cells may grow into spheroids, or in the form of three-dimensional cell colonies.

In living tissue, cells exist in three-dimensional microenvironments with complex cell-cell and cell-matrix interactions and complex transport dynamics. Conventional two-dimensional cell cultures may not adequately reproduce these conditions, which may e.g. lead to limitations in the reliability of in vitro efficacy and toxicity testing of drugs or environmental chemicals and their transferability to living systems. In contrast, three-dimensional cell cultures, for example spheroids, are more similar to in vivo tissues in terms of cellular communication and the development of the extracellular matrix. The extracellular matrix allows cells to move within their spheroid, similar to how cells would move in living tissue. Thus, three-dimensional cell cultures can be used to create improved models for cell migration, cell differentiation, cell survival and cell growth. In addition, in three-dimensional cell cultures the natural cell polarization may be better observed and, in contrast to two-dimensional cell cultures, different gene expression patterns may be analyzed.

The three-dimensional cultivation of cells can basically be carried out using structural scaffolds, for example using hydrogel matrices ("matrigels") of different types, but also without using structural scaffolds. In the latter case, the spheroids already mentioned, i.e. essentially spherical aggregates, may be formed. All variations may be used in the context of embodiments of the present invention.

A special form of three-dimensional cell aggregates are so-called organoids, i.e. simplified three-dimensional cell composites which are produced in vitro and correspond at least partially to organs of living organisms with respect to tissue structure and morphology. Thus, organoids in particular exhibit a realistic microanatomy. Organoids are obtained from cells of a tissue, from embryonic stem cells or induced pluripotent stem cells, which are able to organize themselves in three-dimensional culture due to their self-renewal and differentiation ability. Embodiments of the invention may be used in connection with organoids as well.

Three-dimensional cell cultures and other samples may, in embodiments of the present invention, be formed in, or transferred to, any type of sample carrier, such as, but not limited to, a multiwell plate or a petri dish, in order to be analyzed according to the instrumentalities provided according to embodiments of the present invention. The samples may be randomly distributed in one or more portions of a transparent medium including or not including a scaffolding structure, e.g. a matrigel, for example in wells of a multiwell plate or on a petri dish.

An arrangement for examining a plurality of samples within a sample region in or on a sample carrier provided according to embodiments of the present invention comprises optics selectively imaging the sample region in a transmitted light imaging mode and a lightsheet imaging mode. As further explained at the outset, a number of different configurations of lightsheet fluorescence microscopes are known and embodiments of the present invention may be used with each of them.

Before further explaining specific features of embodiments of the present invention, an overview of lightsheet microscopy imaging techniques and specific features thereof, which may be used in embodiments of the present invention, is given.

As stated in the scientific literature, e.g. in a review by O. E. Olarte et al., "Light-sheet microscopy: a tutorial", *Adv. Opt. Photonics* 10, 2017, 113-179, for visualizing and/or quantifying biological processes in samples such as living organisms, tissues and cells, microscopic methods are needed which one the one hand minimize light damage but on the other hand quickly provide three-dimensional information with high spatial and temporal resolution over large fields of view.

Even if, in confocal laser scanning fluorescence microscopy, the excitation light may be focused to specific points or planes to be observed and unwanted light emissions can be blocked by suitably arranged apertures, fluorescence from regions above and below the focal plane is still excited at least to some extent. In addition, background fluorescence by exciting endogenous fluorescent and non-fluorescent organic components within the sample is also generated to a considerable extent. In connection with these aspects, lightsheet microscopy provides advantages when living specimens and samples are observed over extended time periods, because in such cases conventionally light damage and phototoxicity effects may be caused by continuous or repeated irradiation.

In lightsheet fluorescence microscopy, as e.g. discussed in by P. A. Santi, "Lightsheet Fluorescence Microscopy: A Review", *J. Histochem. Cytochem.* 59, 2011, 129-138, a thin plane of light is used to optically section transparent tissues or whole organisms that have been labelled with a fluorophore. Lightsheet fluorescence microscopy is a non-destructive method that may be used to produce optical sections that are suitable for three-dimensional reconstruction and can essentially be seen as a "non-destructive microtome" technique.

While the basic principles of lightsheet fluorescence microscopy were already discovered and applied at the beginning of the last century, see e.g. H. Siedentopf and R. Zsigmondy, "Über Sichtbarmachung and Größenbestimmung ultramikroskopischer Teilchen, mit besonderer Anwendung auf Goldrubingläsern" *Ann. Phys.* 10, 1903, 1-31, it was not until the publication of an article by J. Huisken et al., "Optical sectioning deep inside live embryos by selective plane illumination microscopy", *Science* 305, 2004, 1007-1009, that development and use of lightsheet fluorescence microscopy were recently accelerated.

Today, different apparatus configurations are used for lightsheet fluorescence microscopy. In essentially all cases, a laser beam is expanded and focused to produce a lightsheet by a cylindrical lens. The lightsheet can be irradiated into the sample volume by illumination optics separate from the observation optics, said illumination optics being arranged to produce the lightsheet in a plane perpendicular to the optical axis of the observation optics, and an optical path of the observation optics being arranged orthogonal to the sample plane. Such configurations may be disadvantageous, however, if there is limited access to the space in front of the observation optics, e.g. when multiwell plates (see below) or glass slides are used.

In such cases, so-called oblique plane microscopy, as e.g. described in an article by C. Dunsby, "Optically sectioned imaging by oblique plane microscopy", *Opt. Express* 16, 2008, 20306-20316 may prove useful. In oblique plane microscopy, generally one high-aperture lens is used both for illumination and detection. For further details and operating principles, reference is made to expert literature.

DE 10 2005 027 077 B4 discloses a lightsheet microscope comprising a lens with which detection light is passed to a detector along a detection beam path defining a detection direction in the region of the lens, and an illumination device that generates a lightsheet that illuminates a sample in an illumination plane corresponding to an irradiation direction of the lightsheet. The illumination plane is produced here in a non-orthogonal angle to the detection direction. The illumination plane illuminated by the lightsheet is imaged onto the detector which is located in an intermediate image plane. Adjustment means for influencing the spatial position of the intermediate image plane of the lightsheet microscope are provided which keep the position of the intermediate image plane constant independently from the orientation of the illumination plane.

Generally, the dimensions of a lightsheet may, in embodiments of the present invention, include a thickness of 1 to 50, e.g., 2 to 30 or 5 to 20 µm at the waist. A lightsheet, due to the nature of its provision, substantially converges and diverges and therefore a usable width is typically in the range of up to 1 mm. By artificially lowering the numerical aperture of the generating lens, it is possible to achieve a thicker sheet that remains parallel over a longer distance.

A further configuration for lightsheet fluorescence microscopy comprises an illumination lens separate from a detection lens, the optical axis of the illumination lens being arranged orthogonally to that of the detection lens, but the optical axis of the illumination lens and the optical axis of the detection lens both being oriented in a non-orthogonal angle to the sample plane. In such a configuration, the space in front of the illumination and the detection lens can be used for placing a conventional sample carrier. So-called dual inverted selective plane illumination microscopy is a further development of such a configuration in which illumination and detection alternates between both objectives, with subsequent image registration and deconvolution applied to fuse the complimentary views.

The application of lightsheet fluorescence microscopy for screening multiwell plates was previously proposed in an article by V. Maioli et al., "Time-lapse 3-D measurements of a glucose biosensor in multicellular spheroids by lightsheet fluorescence microscopy in commercial 96-well plates", *Sci. Rep.* 6, 2016, 1-13. As proposed in this publication, a stage-scanning approach is used to image a volume in the wells of a multiwell plate by oblique plane microscopy.

In an article by B. Eismann et al, "Automated 3D lightsheet screening with high spatiotemporal resolution reveals mitotic phenotypes", *J. Cell Sci.* 133, 2020, 1-13, a workflow including a low-resolution stage scan pre-screening step is proposed. In the pre-screening step, being already performed by lightsheet fluorescence microscopy, the positions of objects to be further analyzed are identified. Subsequently, a plurality of samples is imaged in a time-lapse experiment by dual inverted selective plane imaging microscopy as described above, thus acquiring two stacks of images at an orthogonal angle to each other. In a subsequent data processing step, raw image data are fused using visual information of the image stacks. The samples analyzed are initially prepared in a multiwell plate and thereafter transferred to an imaging plate.

However, in said workflows disclosed in Maioli et al. and Eismann et al., a user must manually search for objects of interest and examine and evaluate the results from different fluorescence channels before then deciding which sample is suitable for further imaging experiments. In connection with such a search and evaluation, valuable time is wasted and the specimen is stressed by a continuing light exposure. This may render the specimen unusable for further investigations because the fluorescence signals get lost due to photobleaching effects or the specimen is damaged by phototoxic effects. This is not the case according to embodiments of the present invention.

If e.g. "lightsheet microscopy" or a "lightsheet imaging mode" is mentioned herein, these terms refer to lightsheet fluorescence microscopy and to a corresponding imaging mode, i.e. the lightsheet provided is used to excite florescence of the samples or stained regions thereof. In light sheet microscopy as understood herein, an illumination beam propagating perpendicular to an imaging system or a detection axis is used, creating a light sheet through a specific two-dimensional plane of a sample or sample region. This imaging plane is generally the same as, or corresponds to, the focal plane, and there is little excitation above or below the focal plane, i.e., there is little out-of-focus light. In light sheet microscopy, by using a cylindrical lens or other light modulating unit, the excitation light is shaped into an hourglass form because the light is compressed in one dimension but not the other. This shape allows a sample to be placed in the thin "waist" of the beam, where only a small plane of the sample is excited. The emitted fluorescence is detected by another lens or the same lens.

Optics referred to herein may include completely separate parts for transmitted light imaging and fluorescence or lightsheet imaging or these may at least in part be combined, such as in oblique plane microscopy. For transmitted light imaging, an illumination unit is provided at a position of the sample opposite to that at which the corresponding imaging optics is provided, as in a conventional transmitted light microscope. The optics may be configured such that, at the same position of the optics, e.g. through the same (front) lens, transmitted light imaging and fluorescence or lightsheet imaging is possible, wherein in this case e.g. switching parts of the optics arranged behind said lens is performed. However, said optics may also comprise different lenses for transmitted light imaging and fluorescence or lightsheet imaging which are selectively moved in and out of position to realize these imaging modalities. A "lens", in the language as used herein, may include one or more optical elements such as individual lenses.

While, hereinbelow, initially reference is made to an arrangement for examining a plurality of samples and embodiments thereof is made, these explanations likewise relate to a corresponding method and vice versa.

According to an embodiment of the present invention, the transmitted light imaging mode comprises, as mentioned, generating and processing a stack of widefield images of the sample region. A corresponding image stack may e.g. be obtained by so-called stage scanning, i.e. by moving the samples or the region momentarily observed in defined displacement steps along an axis vertical to a plane defined by a sample carrier or along the optical axis of the lens used for observing the sample in the transmitted light imaging mode. Corresponding displacement steps may be selected in a way in which an appropriate resolution in the scanning direction is obtained. From the images of the image stack, as generally known in the art, a three-dimensional representation of the corresponding observation region can be obtained by image analysis and image processing, optionally after a registration step, if necessary.

The fluorescence or lightsheet imaging mode used according to an embodiment of the present invention comprises obtaining fluorescence or lightsheet images of the sample at fluorescence or lightsheet imaging positions and processing said fluorescence or lightsheet images. Obtaining fluorescence or lightsheet images may likewise comprise a scan, i.e. a stage-scan as explained above or a scan including tilting a lightsheet in an oblique plane configuration in predetermined steps. Thus, obtaining and processing fluorescence or lightsheet images may also include producing and processing image stacks, essentially as described before, to obtain three-dimensional information. However, fluorescence or lightsheet imaging may also be performed at one position only, e.g. at a position having been found favorable in the transmitted light imaging mode.

According to an embodiment of the present invention, therefore, a processing apparatus is used, this processing apparatus being part of the arrangement mentioned, and this processing apparatus being adapted to perform, in the sample region or several positions therein, a series of steps including a transmitted light and widefield pre-screen, identifying regions of interest, and thereafter imaging said regions of interest in the fluorescence or lightsheet imaging mode.

The processing apparatus may include any number of sub-components or may be implemented as one single component. The processing apparatus may, for example, include a controller being part of a microscope system or a computer associated therewith, and a separate (data or image) processing system, which may likewise be part of a microscope system or a separate computer. A computer may be a local computer, a server, an embedded device, a mobile device such as a tablet or mobile phone or any other component suitable to implement the series of steps performed according to embodiments of the present invention.

In this series of steps, the processing apparatus provides operating instructions causing the arrangement to be operated in the transmitted light imaging mode. As mentioned, one or more regions of interest in the sample region are selected using selection information obtained on the basis of the stack of widefield images generated in the transmitted light imaging mode, and position information relating to the one or more regions of interest selected in the sample region are provided. Ultimately, operating instructions causing the arrangement to be operated in the lightsheet or a different fluorescence imaging mode at one or more lightsheet or other fluorescence imaging positions on the basis of the position information are provided.

A major advantage of the inventive workflow comprising said steps is that the energy input into the specimens is kept as low as possible because a sample-friendly transmitted light imaging modality is used for the pre-screen, i.e. in the step in which the stack of widefield images is obtained. In contrast to known methods, reduced amounts of light, e.g., fluorescence-emitting light, are needed due to the pre-scan performed using the widefield imaging mode.

Expressed in other words, a procedure being performed by an arrangement according to an embodiment of the present invention firstly comprises a pre-screen using a transmitted light imaging modality with a large field of view of the sample carrier (e.g. a multi-well plate or a petri dish) that contains a multitude of specimens, i.e. of the sample region. Subsequently thereto, a detection or definition step for regions of interest is performed and position information including e.g. locations (such as a center of mass), spatial dimensions and other features are obtained on the basis of the acquired transmitted light image stacks using image processing algorithms and/or using user input. The identified specimen candidates, e.g. candidate regions of interest, may be presented to a user in an interactive user interface, as further explained below. The user may then select a subset of these candidates or filter candidates based on measured features and adapt parameters for subsequent imaging using the fluorescence imaging modality, i.e. light sheet-based or other fluorescence microscopy.

In more general terms, the arrangement provided according to an embodiment of the present invention may comprise user interface means furnishing or providing the selection information on the basis of a user input. Such user interface means may be provided in a form generally known in the art and may be provided close to, in mechanical association with, or remote from the further parts of the arrangement. User interface means used in embodiments of the present invention may include one or more components selected from a keyboard, a display screen, a touchscreen, a mouse, a trackball, a trackpad, a joystick, and combinations thereof.

According to a such an embodiment of the present invention, the user interface means may present user information relating to potential regions of interest provided on the basis of the stack of widefield images obtained in the transmitted light imaging mode to the user, either in the form of graphical information and/or in the form of other types of information derived in a suitable manner from the stack of widefield images, such as a list of potential regions of interest comprising further information. The user information is derived from the stack of widefield images and may include at least one of position information relating to potential regions of interest, a textual representation (such as a list) of potential regions of interest, and a graphic representation relating to potential regions of interest derived from the stack of widefield images. In any case, such user information is provided to select therefrom, as further described below.

The processing apparatus provided according to an embodiment of the present invention automatically preselects the potential regions of interest on the basis of an automated image analysis of the stack of widefield images for presentation as the user information, e.g. on the basis of training data and on the basis of a machine learning algorithm using said training data, or via a comparison to reference data defined before, or virtually based on any method or algorithm conceivable. The candidate regions of interest may be presented to the user as the user information using the user interface means, and the user input in such cases may include confirming and rejecting the candidate regions of interest to provide the selection information according to an expertise of the user.

For example, the automated image analysis of the stack of widefield images may include sectioning these data to differentiate objects of potential interest from background or other objects, e.g. on the basis of at least one of color, size, density and shape. The objects of potential interest may be compared to thresholds, with reference data, or may be analyzed on the basis of training data provided to a machine learning process, which may also be obtained and/or refined in the course of operating the arrangement of an embodiment of the present invention or performing a corresponding method. The objects of potential interest fulfilling corresponding criteria or being identified on the basis of a machine learning process may then be presented for selection to a user. Only objects confirmed by the user are further used in the process. In such configurations, whether a user confirms or rejects corresponding suggestions may be used to provide a feedback to a machine learning process, thus further refining increasing reliability of further selections. In the latter case, gradually less irrelevant information may be presented to the user.

In a different embodiment, however, after a corresponding training of a machine learning process has been performed or if a determination is reliable per se, the arrangement provided according to an embodiment of the present invention, or, more precisely, the processing apparatus provided according to an embodiment of the present invention, may operate, in terms of the selection of the one or more regions of interest in the sample region, without user input, selection information in this case being obtained fully automatically on the basis of the stack of widefield images generated in the transmitted light imaging mode. That is, said selecting one or more regions of interest in the sample region based on selection information obtained on the basis of the stack of widefield images generated in the transmitted light imaging mode may be performed fully automatically on the basis of an automated image analysis without user interaction, for example on the basis of machine learning.

In an embodiment, which was already mentioned above, the apparatus provided according to an embodiment of the present invention may provide a graphic representation of the stack of widefield images to the user as the user information, e.g. in the form of a three-dimensional image or any section image, using the user interface means. In this case, the user input may comprise selecting regions of interest in the graphic representation to be further processed. Independently from the specific form of user information provided, the user input may comprise a selection from the potential regions of interest by confirming and rejecting preselected regions of interest included in the user information.

That is, in the arrangement according to a corresponding embodiment, the user information, e.g., a graphic representation in the form of a two or three dimensional representation, may be provided on a display screen of the user interface means.

In an arrangement according to an embodiment of the present invention, the user interface means may further provide imaging parameters relating to the transmitted light imaging mode and/or the fluorescence or lightsheet imaging mode on the basis of a further user input. In other words, from the user interface displaying the specimen candidates, the user can in such a case configure parameters for subsequent imaging using the transmitted light image modality and/or fluorescence or lightsheet imaging modality and thus preferably further increase the quality of analysis.

As mentioned, different modalities or configurations for fluorescence or lightsheet fluorescence microscopy may be used according to embodiments of the present invention. In the arrangement according to an embodiment of the present invention, therefore, the optics selectively imaging the sample region in the transmitted light imaging mode and a lightsheet imaging mode may comprise a common lens, the common lens imaging the sample region in the transmitted light imaging mode and in the lightsheet imaging mode and irradiating the lightsheet into the sample region in the lightsheet imaging mode.

The arrangement according to a corresponding embodiment preferably includes that said optics selectively imaging the sample region are adapted to perform oblique plane lightsheet fluorescence microscopy in the lightsheet imaging mode, either with a fixed or an adjustable lightsheet angle.

In further embodiments, however, optics for performing the lightsheet imaging mode may take any form known from the prior art and previously explained. For example, for selectively imaging the sample region in the transmitted light imaging mode and the lightsheet imaging mode a first lens and a second may be provided. These may be arranged in the manner already explained above, i.e. with their optical axes arranged orthogonally to each other and inclined to a sample plane.

Embodiments of the present invention may also be used in connection with inverted selective plane illumination microscopy as explained above, i.e., in the lightsheet imaging mode, one of the first lens and the second lens alternatingly images the sample region while the other one of the first lens and the second lens irradiates the lightsheet into the sample region. In such a manner, image stacks with orthogonally arranged planes may be obtained and synthesized to form improved three-dimensional information.

As also indicated above, the position information on whose basis the arrangement operates in the lightsheet imaging mode at the one or more lightsheet imaging positions may comprise at least one of one or more geometrical centers and one or more dimensions of the one or more regions of interest. As generally known, in mathematics and physics, the centroid or geometric (al) center of a plane figure is the arithmetic mean position of all the points in the figure, and for each or at least some of the regions of interest such a position can be determined and/or used according to embodiments of the present invention. Informally, the geometrical center it is the point at which a cutout of the shape (with uniformly distributed mass) could be perfectly balanced on the tip of a pin. Dimensions include a diameter, a with, a height, a circumference, etc., for example.

Figure 2C:
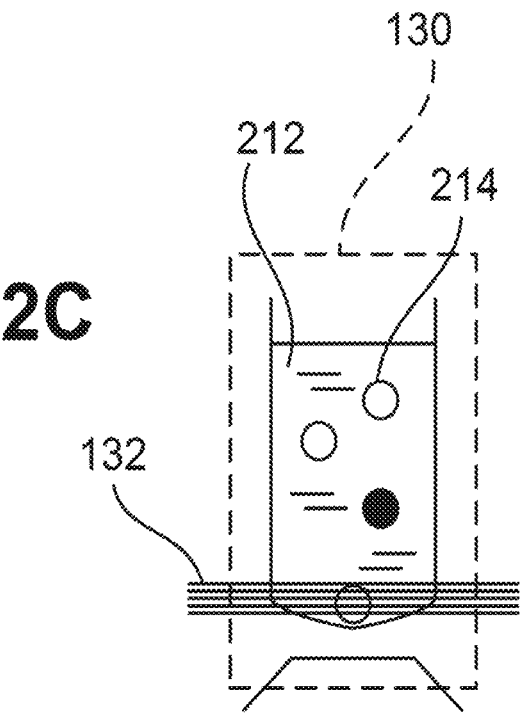
FIGS. 2C and 2D show detail views of FIGS. 2A and 2B.
Figure 2D:
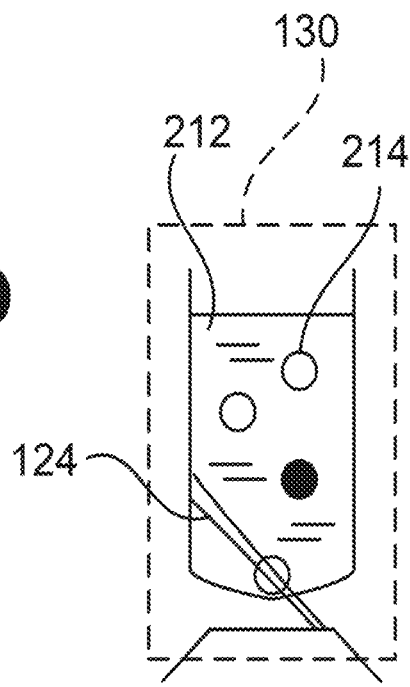

FIGS. 2C and 2D illustrate details of sample regions 130 already shown in FIGS. 2A and 2B, respectively. Reference is made to the explanations above.

Figure 3:
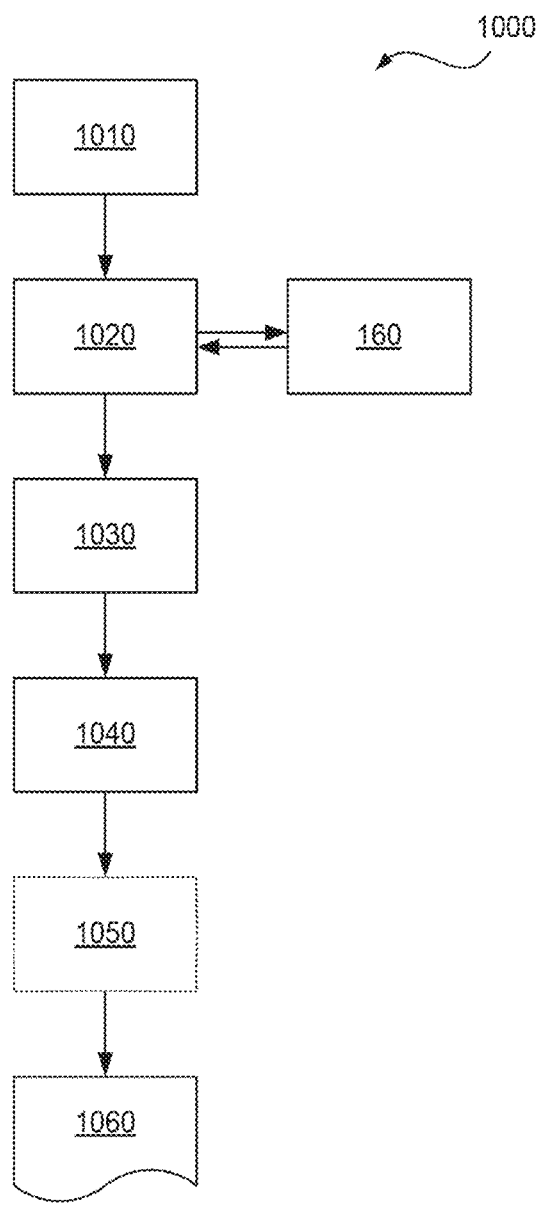
FIG. 3 illustrates a method according to an embodiment of the present invention in a simplified flowchart.

FIG. 3 illustrates a method 1000 according to an embodiment of the present invention in the form of a simplified flow diagram.

In a step 1010 of the method 1000, operating instructions, as indicated with 152 in FIG. 2A, are provided, causing the arrangement 100 to be operated in the transmitted light imaging mode and thus to provide said stack of widefield images 132 of the sample region 130.

In a next step 1020, one or more regions of interest in the sample region 130 are selected using selection information obtained on the basis of the stack of widefield images 132 generated in the transmitted light imaging mode, i.e. in step 1010. This may be done in interaction with the user interface means 160 providing the selection information on the basis of a user input, as extensively explained above.

On this basis, in a subsequent step 1030, position information relating to the one or more regions of interest selected in the sample region 130, e.g. relating to specific ones of the samples 214, such as in the form of geometrical information, is provided.

In a yet further step 1040, the processing apparatus 150 provides operating instructions, as indicated with 154 in FIG. 2B, causing the arrangement 100 to be operated in the lightsheet imaging mode at one or more lightsheet imaging positions on the basis of the position information.

In one or more optional further steps 1050, the lightsheet imaging data thus obtained may be further processed and output or stored in a step 1060.

Figure 4:
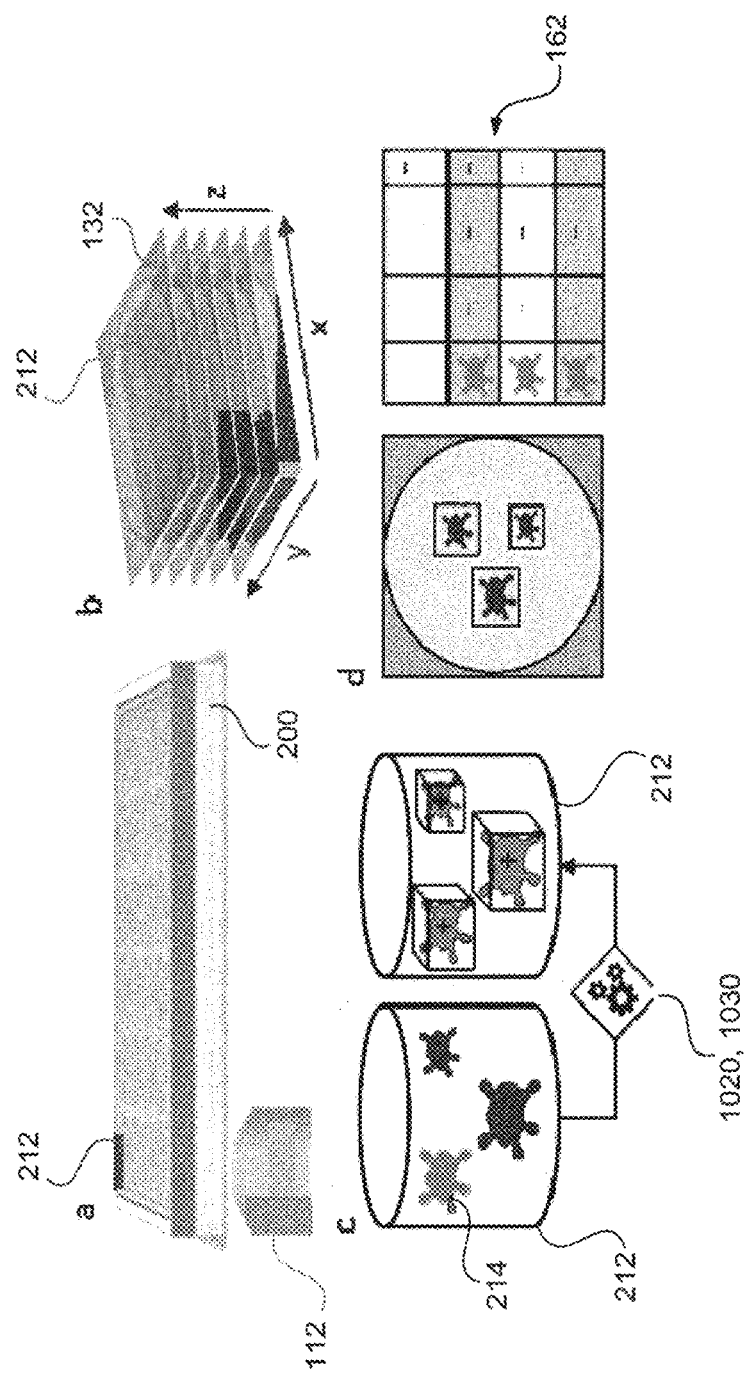
FIG. 4 illustrates further aspects of a method according to an embodiment of the present invention.

FIG. 4 illustrates further aspects of a method according to an embodiment of the present invention and partially repeats aspects already discussed before.

In view a of FIG. 4, essentially the same situation as in FIG. 2A is shown. Reference is made to the explanations above. View b further illustrates a stack of widefield images 132 generated in the transmitted light imaging mode, i.e. in step 1010 as explained before. View c illustrates how, in steps 1020 and 1030, one or more regions of interest in the sample region 130 using selection information obtained on the basis of the stack of widefield images 132 generated in the transmitted light imaging mode are selected and how position information relating to the one or more regions of interest selected in the sample region 130 are provided. View d illustrates possible alternatives for presenting corresponding information to a user via a display screen 162 of a user interface unit.

Some or all of the method steps referred to above may be executed by (or using) a hardware apparatus, like for example, a processor, a microprocessor, a programmable computer or an electronic circuit. In some embodiments, some one or more of the method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention and preferred embodiments thereof comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, e.g., be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

That is, a computer program with a program code for performing the method according to embodiments of the present invention or any embodiment thereof when the computer program is run on a processor, e.g., a processor which is part of the processing apparatus referred to above is also part of the embodiments of the present invention.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein and embodiments thereof. The data stream or the sequence of signals may, for example, be configured to be transferred via a data communication connection, for example via the internet.

A yet further embodiment of the invention comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein and embodiments thereof. Generally, the methods are preferably performed by any hardware apparatus.

As used herein the term "and/or" includes any and all combinations of one or more of the associated listed items and may be abbreviated as "/".

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

As mentioned above in connection with the selection of one or more regions of interest in the sample region, e.g., in connection with automatically recognizing such regions and/or presenting such regions to a user and optionally providing a feedback on the basis of a confirmation or rejection by a user, embodiments of the present invention can be used in connection with machine-learning in an embodiment.

Therefore, embodiments of the present invention may be based on using a machine-learning model or machine-learning algorithm. Machine learning may refer to algorithms and statistical models that computer systems may use to perform a specific task without using explicit instructions, instead relying on models and inference. For example, in machine-learning, instead of a rule-based transformation of data, a transformation of data may be used, that is inferred from an analysis of historical and/or training data. For example, the content of images may be analyzed using a machine-learning model or using a machine-learning algorithm. In order for the machine-learning model to analyze the content of an image, the machine-learning model may be trained using training images as input and training content information as output. By training the machine-learning model with a large number of training images and/or training sequences (e.g. words or sentences) and associated training content information (e.g. labels or annotations provided by a user), the machine-learning model "learns" to recognize the content of the images, so the content of images that are not included in the training data can be recognized using the machine-learning model. The same principle may be used for other kinds of sensor data as well: By training a machine-learning model using training sensor data and a desired output, the machine-learning model "learns" a transformation between the sensor data and the output, which can be used to provide an output based on non-training sensor data provided to the machine-learning model. The provided data (e.g. sensor data, meta data and/or image data) may be preprocessed to obtain a feature vector, which is used as input to the machine-learning model.

Machine-learning models may be trained using training input data. The examples specified above use a training method called "supervised learning". In supervised learning, the machine-learning model is trained using a plurality of training samples, wherein each sample may comprise a plurality of input data values, and a plurality of desired output values, i.e. each training sample is associated with a desired output value. By specifying both training samples and desired output values, the machine-learning model "learns" which output value to provide based on an input sample that is similar to the samples provided during the training. Apart from supervised learning, semi-supervised learning may be used. In semi-supervised learning, some of the training samples lack a corresponding desired output value. Supervised learning may be based on a supervised learning algorithm (e.g. a classification algorithm, a regression algorithm or a similarity learning algorithm. Classification algorithms may be used when the outputs are restricted to a limited set of values (categorical variables), i.e. the input is classified to one of the limited set of values. Regression algorithms may be used when the outputs may have any numerical value (within a range). Similarity learning algorithms may be similar to both classification and regression algorithms but are based on learning from examples using a similarity function that measures how similar or related two objects are. Apart from supervised or semi-supervised learning, unsupervised learning may be used to train the machine-learning model. In unsupervised learning, (only) input data might be supplied and an unsupervised learning algorithm may be used to find structure in the input data (e.g. by grouping or clustering the input data, finding commonalities in the data). Clustering is the assignment of input data comprising a plurality of input values into subsets (clusters) so that input values within the same cluster are similar according to one or more (pre-defined) similarity criteria, while being dissimilar to input values that are included in other clusters.

Reinforcement learning is a third group of machine-learning algorithms. In other words, reinforcement learning may be used to train the machine-learning model. In reinforcement learning, one or more software actors (called "software agents") are trained to take actions in an environment. Based on the taken actions, a reward is calculated. Reinforcement learning is based on training the one or more software agents to choose the actions such, that the cumulative reward is continuously increased, leading to software agents that become better at the task they are given (as evidenced by increasing rewards).

Furthermore, some further techniques may be applied to some of the machine-learning algorithms according to an embodiment. For example, feature learning may be used. In other words, the machine-learning model may at least partially be trained using feature learning, and/or the machine-learning algorithm may comprise a feature learning component. Feature learning algorithms, which may be called representation learning algorithms, may preserve the information in their input but also transform it in a way that makes it useful, often as a pre-processing step before performing classification or predictions. Feature learning may be based on principal components analysis or cluster analysis, for example.

In some examples, anomaly detection (i.e. outlier detection) may be used, which is aimed at providing an identification of input values that raise suspicions by differing significantly from the majority of input or training data. In other words, the machine-learning model may at least partially be trained using anomaly detection, and/or the machine-learning algorithm may comprise an anomaly detection component.

In examples, the machine-learning algorithm may use a decision tree as a predictive model. In other words, the machine-learning model may be based on a decision tree. In a decision tree, observations about an item (e.g. a set of input values) may be represented by the branches of the decision tree, and an output value corresponding to the item may be represented by the leaves of the decision tree. Decision trees may support both discrete values and continuous values as output values. If discrete values are used, the decision tree may be denoted a classification tree, if continuous values are used, the decision tree may be denoted a regression tree.

Association rules are a further technique that may be used in machine-learning algorithms according to embodiments of the present invention. In other words, the machine-learning model may be based on one or more association rules. Association rules are created by identifying relationships between variables in large amounts of data. The machine-learning algorithm may identify and/or utilize one or more relational rules that represent the knowledge that is derived from the data. The rules may e.g. be used to store, manipulate or apply the knowledge accordingly.

Machine-learning algorithms are usually based on a machine-learning model. In other words, the term "machine-learning algorithm" may also denote a set of instructions that may be used to create, train or use a machine-learning model. The term "machine-learning model" may denote a data structure and/or set of rules that represents the learned knowledge (e.g. based on the training performed by the machine-learning algorithm). In embodiments, the usage of a machine-learning algorithm may imply the usage of an underlying machine-learning model (or of a plurality of underlying machine-learning models). The usage of a machine-learning model may imply that the machine-learning model and/or the data structure/set of rules that is the machine-learning model is trained by a machine-learning algorithm.

For example, the machine-learning model may be an artificial neural network (ANN). ANNs are systems that are inspired by biological neural networks, such as can be found in a retina or a brain. ANNs comprise a plurality of interconnected nodes and a plurality of connections, so-called edges, between the nodes. There are usually three types of nodes, input nodes that receiving input values, hidden nodes that are (only) connected to other nodes, and output nodes that provide output values. Each node may represent an artificial neuron. Each edge may transmit information, from one node to another. The output of a node may be defined as a (non-linear) function of its inputs (e.g. of the sum of its inputs). The inputs of a node may be used in the function based on a "weight" of the edge or of the node that provides the input. The weight of nodes and/or of edges may be adjusted in the learning process. In other words, the training of an artificial neural network may, according to the comprise adjusting the weights of the nodes and/or edges of the artificial neural network, i.e. to achieve a desired output for a given input.

Alternatively, the machine-learning model may be a support vector machine, a random forest model or a gradient boosting model. Support vector machines (i.e. support vector networks) are supervised learning models with associated learning algorithms that may be used to analyze data (e.g. in classification or regression analysis). Support vector machines may be trained by providing an input with a plurality of training input values that belong to one of two categories. The support vector machine may be trained to assign a new input value to one of the two categories. Alternatively, the machine-learning model may be a Bayesian network, which is a probabilistic directed acyclic graphical model. A Bayesian network may represent a set of random variables and their conditional dependencies using a directed acyclic graph. Alternatively, the machine-learning model may be based on a genetic algorithm, which is a search algorithm and heuristic technique that mimics the process of natural selection.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

- 100 Arrangement
- 10 Microscope system
- 20 Computer system
- 30 Interaction
- 110 Optics
- 112 Lens
- 120 Optics
- 122 Lens
- 130 Sample region
- 132 Widefield image
- 140 Image acquisition unit
- 150 Processing apparatus
- 152 Operating instructions
- 160 User interface means
- 162 Screen
- 170 Sample holder
- 180 Illumination device
- 200 Sample carrier
- 210 Wells
- 214 Sample
- 212 Liquid or matrix
- 1000 Method
- 1010 Providing widefield imaging operating instructions
- 1020 Selecting one or more regions
- 1030 Providing position information
- 1040 Providing lightsheet imaging operating instructions
- 1050 Further processing
- 1060 Providing or storing results

The invention claimed is:

1. An arrangement configured for examining a plurality of samples within a sample region, the arrangement comprising:
    optics configured to selectively image the sample region in a transmitted light imaging mode or a fluorescence imaging mode, the transmitted light imaging mode being adapted to generate and process a stack of widefield images of the sample region, and the fluorescence imaging mode being adapted to obtain fluorescence images of at least one of the plurality of samples at one or more fluorescence imaging positions and to process the fluorescence images, and
    a processing apparatus configured to:
    provide first operating instructions causing the arrangement to be operated in the transmitted light imaging mode,
    select one or more regions of interest in the sample region based on selection information obtained based on the stack of widefield images generated in the transmitted light imaging mode,
    provide position information relating to the one or more regions of interest selected in the sample region, and
    provide second operating instructions causing the arrangement to be operated in the fluorescence imaging mode at the one or more fluorescence imaging positions based on the position information relating to the one or more regions of interest.

2. The arrangement according to claim 1, wherein the fluorescence imaging mode is a lightsheet imaging mode, and wherein the arrangement is configured to provide a lightsheet at the fluorescence imaging positions in the lightsheet imaging mode.

3. The arrangement according to claim 1, further comprising a user interface configured to provide selection information based on a user input.

4. The arrangement according to claim 3, wherein the user interface is configured to present user information to a user, the user information being derived from the stack of widefield images obtained in the transmitted light imaging mode and including at least one of position information relating to potential regions of interest, a textual representation of the potential regions of interest, or a graphic representation relating to the potential regions of interest.

5. The arrangement according to claim 4, wherein the processing apparatus is configured to automatically preselect the potential regions of interest based on an automated image analysis of the stack of widefield images for presentation as the user information.

6. The arrangement according to claim 5, wherein the preselection is performed by the automated image analysis.

7. The arrangement according to claim 5, wherein the user input is adapted to select from the potential regions of interest by confirming and rejecting the preselected potential regions of interest included in the user information.

8. The arrangement according to claim 4, wherein the user information is provided on a display screen of the user interface.

9. The arrangement according to claim 1, wherein the selection of one or more regions of interest is performed fully automatically by the processing apparatus based on an automated image analysis without user interaction.

10. The arrangement according to claim 6, wherein the automated image analysis is performed based on machine learning.

11. The arrangement according to claim 1, wherein the optics configured to selectively image the sample region in the transmitted light imaging mode or the fluorescence imaging mode comprises a common lens, the common lens being configured to image the sample region in the transmitted light imaging mode and in the fluorescence imaging mode and to irradiate light into the sample region in the fluorescence imaging mode.

12. The arrangement according to claim 2, wherein the optics configured to selectively image the sample region is adapted to perform oblique plane lightsheet microscopy in the fluorescence imaging mode.

13. The arrangement according to claim 1, wherein the position information comprises at least one of one or more geometrical centers or one or more dimensions of the one or more region of interest.

14. A method for examining a plurality of samples within a sample region, the method comprising:
    selectively imaging the sample region, using an optical arrangement, in a transmitted light imaging mode or a fluorescence imaging mode, wherein imaging in the transmitted light imaging mode comprises generating and processing a stack of widefield images of the sample region, and imaging in the fluorescence imaging mode comprises obtaining and processing fluorescence images of at least one sample of the plurality of samples at one or more fluorescence imaging positions,
    providing first operating instructions causing the optical arrangement to be operated in the transmitted light imaging mode,
    selecting one or more regions of interest in the sample region using selection information obtained based on the stack of widefield images generated in the transmitted light imaging mode,
    providing position information relating to the one or more regions of interest selected in the sample region, and
    providing second operating instructions causing the optical arrangement to be operated in the fluorescence imaging mode at the one or more fluorescence imaging positions based on the position information.

15. The method according to claim 14, wherein the fluorescence imaging mode is a lightsheet imaging mode in which a lightsheet is provided at the fluorescence imaging positions.

16. The method according to claim 14, wherein the plurality of samples is provided on a sample carrier in a form of a multiwell plate or a petri dish.

17. A non-transitory computer-readable medium having computer program steps stored thereon, the program steps, when executed by a computer processor, causing performance of a method for examining a plurality of samples within a sample region, the method comprising:

selectively imaging the sample region, using an optical arrangement, in a transmitted light imaging mode or a fluorescence imaging mode, wherein imaging in the transmitted light imaging mode comprises generating and processing a stack of widefield images of the sample region, and imaging in the fluorescence imaging mode comprises obtaining and processing fluorescence images of the plurality of samples at one or more fluorescence imaging positions, providing first operating instructions causing the optical arrangement to be operated in the transmitted light imaging mode, selecting one or more regions of interest in the sample region using selection information obtained based on the stack of widefield images generated in the transmitted light imaging mode, providing position information relating to the one or more regions of interest selected in the sample region, and providing second operating instructions causing the optical arrangement to be operated in the fluorescence imaging mode at the one or more fluorescence imaging positions based on the position information.

18. The method according to claim 14, wherein the plurality of samples are biological cells in cell consortia, aggregates, or tissues.

* * * * *